Aug. 20, 1929.   M. J. DONER   1,725,258
WINDSHIELD WIPER
Filed July 2, 1928   2 Sheets-Sheet 1
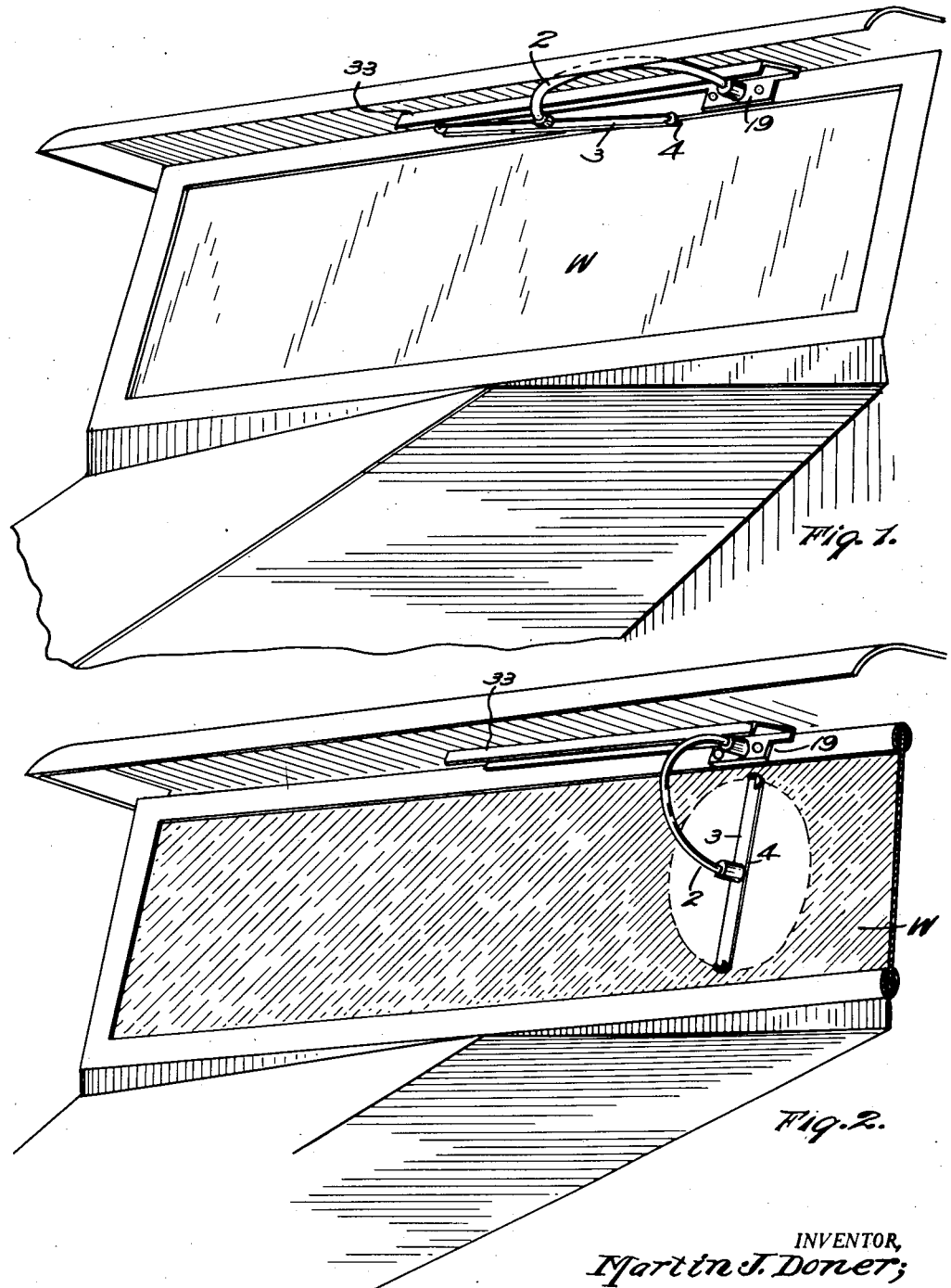
INVENTOR,
Martin J. Doner;
BY
ATTORNEY

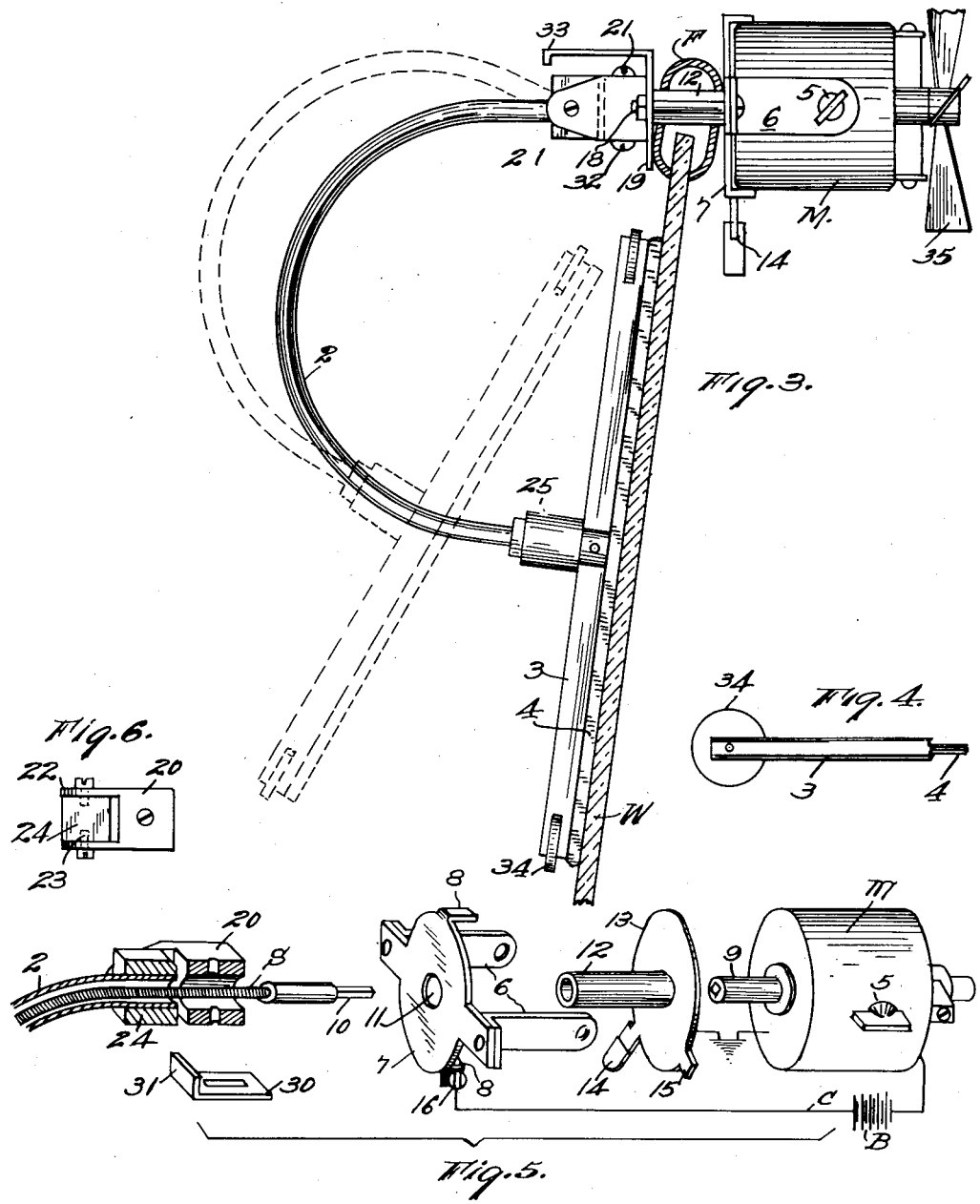

Patented Aug. 20, 1929.

1,725,258

UNITED STATES PATENT OFFICE.

MARTIN J. DONER, OF LOS ANGELES, CALIFORNIA.

WINDSHIELD WIPER.

Application filed July 2, 1928. Serial No. 289,790.

This invention relates to window wipers and more especially to windshield wipers for shields provided with a source of electric energy.

The driving of automobiles, trucks and pleasure boats is rendered quite hazardous in such periods when moisture congeals or collects on the front view windshields and an object of my present invention is to provide a very simple, inexpensive and practicable wiper operative by electric energy of the light and power plant of the vehicle.

A further object is to provide a windshield wiper which includes an effective cleaning member capable of being readily adjusted from a concealed or retracted position to an effective position and to provide a cleaner which is thrown into action or operation only and automatically at its effective position.

Another object is to provide a rotary cleaner and an adjustable crane therefor and means for swinging the crane to the effective position and then closing the circuit of the motor to actuate the cleaner.

An additional object is to provide for automatically deflecting the cleaner to an inconspicuous position when the crane is retracted.

Other objects, advantages and features of construction and combination, and details of means will be made manifest in the ensuing description of the herewith illustrative embodiment; it being understood that modifications, variations and adaptations may be resorted to within the spirit, scope and principle of the invention as it is more directly claimed hereinafter.

Figure 1 is a perspective of the applied device, in retracted position.

Figure 2 is a perspective showing the cleaner in effective position.

Figure 3 is a side elevation of the device, in effective position on a windshield.

Figure 4 is a plan of one end of the wiper bar and its guide roller.

Figure 5 is a perspective view of detached elements of the device; certain parts being in section.

Figure 6 is a plan of a bearing member and a tilting block thereon.

Figure 7 is an axial section of the drive head assembly and

Figure 8 is an end view of the wiper bar.

Generally, the present device includes a suitable electric motor M, served by battery B or other source of current, to be attached to a convenient part of the windshield W; the motor having an extended, flexible shaft attachment S running in a goose-neck or crane 2.

The crane carries a wiper bar 3 in which is mounted a rubber, or felt, or other suitable cleaning strip 4 rotative against the glass W by the shaft S.

The motor M is fixed by clamp screws 5 between bracket arms 6 provided on a base plate 7 also having stay lugs 8 to hold the motor. The motor armature stem 9 is formed to interlock with a coupling pin 10 of the flexible shaft S.

The base or bracket plate 7 is apertured at 11 to receive the elongated hub 12 of a control disc 13 which has a hand lever 14 and a contact 15 engageable with a fixed contact 16 of the motor circuit C. When the control disc is turned the contacts 15—16 coact to hold the disc set.

The windshield frame F is drilled to receive the hub 12 and also bolts 18 which engage the plate 7 and pass through a front panel 19, and serve to clamp the bracket plate 7 and the front panel to the frame F; the disc 13 being free between the motor and the plate 7.

In front of the panel 19 is a bearing member 20 fixed on the hub 12 by a set screw 21 and having bearing ears 22 between and on which is trunnioned, at 23, a tilting block 24 so that the crane can be angularly adjusted, on the trunnion 23, according to the slant of the windshield W.

The crane 2 has fixed on its lower or outer end a housing 25 in which is a rotative head 26 which is fixed on the near end of the shaft S. The head has an external yoke 27 and in this is detachably mounted the clear bar 3, which is in the form of a channel piece in which the wiping felt 4 is clinched.

An end thrust bearing 28 supports the rotary head 26.

The angle of the crane block 24 is adjusted by means of a slotted slide 30 having a lug 31 resting against the near corner of the block and being secured in adjusted position by a set screw 32 in the bearing 20.

By means of the controller handle 14 the attached bearing 20 and its crane 2 are rotated on the axis of the hub 12 from a retracted position Fig. 1 to an effective position Fig. 2, which bring the wiper 4 in front of the driver of the vehicle.

When in this position the motor circuit contacts 15—16 engage and the wiper bar is rotated on the axis of the housing 25 which is perpendicular to the glass W.

As the wiper bar is retracted by the crane it is brought up under a deflector hood 33 which is engaged by antifriction rollers 34 provided on the bar 3. Hence when the crane is pulled up the incidentally upper roller 34 striking the deflector hood 33 will cause the bar to draw up close under the hood and out of the vision of the driver.

The motor shaft may be provided with an air circulating fan 35 which will set up a circulation of air in the car as is very desirable when driving if the temperature within the car body is distressingly high.

What is claimed is:

1. A windshield cleaning apparatus comprising a hollow crane carrying on its swinging end a rotary wiper operative on a glass windshield, an electric motor having a flexible shaft running in the crane and driving the wiper, and bracket means for mounting the crane in operative position said motor mounted on said bracket and the crane being mounted on the motor shaft.

2. A windshield cleaning apparatus comprising a hollow crane carrying on its swinging end a rotary wiper operative on a glass windshield, an electric motor having a flexible shaft running in the crane and driving the wiper, a bracket on which the motor and crane are mounted in operative position, and means for swinging the crane to carry the wiper to and from effective position.

3. A windshield cleaning apparatus comprising a bracket device having a hollow crane carrying on its swinging end a rotary wiper operative on a glass windshield, an electric motor on the bracket having a flexible shaft running in the crane and driving the wiper, means for mounting the bracket to hold the motor and crane in operative position, and means for swinging the crane to carry the wiper to and from effective position, and for closing the motor circuit when the wiper is in effective position.

4. A windshield cleaning apparatus comprising a hollow crane carrying on its swinging end a rotary wiper operative on a glass windshield, an electric motor having a flexible shaft running in the crane and driving the wiper, and means for mounting the crane in operative position swingably on the motor shaft; said crane being tiltably supported on said means; whereby to change the angle of the plane of rotation of the wiper according to the angle of the windshield.

5. A windshield cleaning apparatus comprising a hollow crane carrying on its swinging end a rotary wiper operative on a glass windshield, an electric motor having a flexible shaft running in the crane and driving the wiper, and means for mounting the motor and crane in operative position; said crane being tiltably supported; whereby to change the angle of the plane of rotation of the wiper according to the angle of the windshield, and adjustable means to support the crane at different tilted angles.

6. A windshield cleaning apparatus comprising a hollow crane carrying on its swinging end a rotary wiper operative on a glass windshield, an electric motor on the shaft of which the crane is turnably mounted and having a flexible shaft running in the crane and driving the wiper, and means for mounting the motor and crane in operative position, and means engageable by the said wiper to turn the wiper about the crane end to an inconspicuous position of rest when out of use.

7. A windshield cleaning apparatus including a bracket device attachable to a windshield element, a motor attached to the bracket, a rotary controller mounted on the bracket, a bearing member fixed on the controller to turn on the axis of the motor, a hollow crane pivoted on the said member with one end on the axis of the motor, a flexible shaft passing through the crane and coupled at one end to the motor and at its other having a wiper means rotative thereby on a windshield.

MARTIN J. DONER